United States Patent
Jeon

(10) Patent No.: US 12,499,600 B2
(45) Date of Patent: Dec. 16, 2025

(54) METHOD AND DEVICE FOR IMPLEMENTING VOICE-BASED AVATAR FACIAL EXPRESSION

(71) Applicant: FluentT Inc., Pohang-si (KR)

(72) Inventor: Ye Chan Jeon, Seoul (KR)

(73) Assignee: FluentT Inc., Pohang-si (KR)

( * ) Notice: Subject to any disclaimer, the term of this patent is extended or adjusted under 35 U.S.C. 154(b) by 99 days.

(21) Appl. No.: 18/501,107

(22) Filed: Nov. 3, 2023

(65) Prior Publication Data

US 2024/0153181 A1     May 9, 2024

(30) Foreign Application Priority Data

Nov. 9, 2022 (KR) .................. 10-2022-0148539

(51) Int. Cl.
| | |
|---|---|
| G10L 13/00 | (2006.01) |
| G06T 13/00 | (2011.01) |
| G06T 13/20 | (2011.01) |
| G06T 13/40 | (2011.01) |
| G10L 25/30 | (2013.01) |

(52) U.S. Cl.
CPC ............ G06T 13/205 (2013.01); G06T 13/40 (2013.01); G10L 25/30 (2013.01)

(58) Field of Classification Search
None
See application file for complete search history.

(56) References Cited

U.S. PATENT DOCUMENTS

| | | | | |
|---|---|---|---|---|
| 2012/0130717 A1* | 5/2012 | Xu | ........................ | G06F 3/167 |
| | | | | 345/473 |
| 2022/0189454 A1* | 6/2022 | Huang | .................. | G10L 13/047 |

FOREIGN PATENT DOCUMENTS

| | | |
|---|---|---|
| KR | 20210052380 A | 5/2021 |
| KR | 10-2346756 B1 | 1/2022 |
| KR | 102390781 B1 | 4/2022 |

OTHER PUBLICATIONS

Mngruo Fan, et al.; FaceFormer: Speech-Driven 3D Facial Animation With Transformers; Proceedings of the IEEE/CVF Conference on Computer Vision and Pattern Recognition (CVPR), 2022, pp. 18770-18780.
Request for the Submission of an Opinion Office Action dated Jul. 30, 2023 for KR10-2022-0148539.

* cited by examiner

Primary Examiner — Carl Adams
(74) Attorney, Agent, or Firm — NKL LAW; Jae Youn Kim

(57) ABSTRACT

A Method for Implementing Voice-Based Avatar Facial Expression. The method comprises: obtaining, by a processor included in a computing device, chunks based on a voice signal, wherein the chunks comprise an amplitude information of the voice signal for a particular time, inputting input signals corresponding to the chunks into a neural network, computing, by a layer included in the neural network, a value reflecting a relationship between at least two of the input signals based on the input signals, predicting, by an output layer included in the neural network, facial expression coefficients by outputting output signals based on the value and implementing an expression of a predetermined avatar based on the facial expression coefficients. At least two of the output signals are generated by reflecting a relationship between at least two of the input signals.

6 Claims, 9 Drawing Sheets

METHOD AND DEVICE FOR IMPLEMENTING VOICE-BASED AVATAR FACIAL EXPRESSION

TECHNICAL FIELD

The present invention relates to a method and device for implementing voice-based avatar facial expressions, and more particularly, to a method and device for implementing avatar facial expressions based on voice signals by applying voice signals to a neural network.

BACKGROUND

The metaverse, implemented using VR (Virtual Reality) devices or AR (Augmented Reality) devices, refers to a network of 3D virtual worlds.

To create 3D avatars in the 3D virtual world that resemble real users, cameras are required. However, when users wear VR or AR devices, cameras cannot easily track the user's facial expressions. Therefore, there is a problem that the user's facial expressions cannot be realistically implemented.

Hence, there is a demand for technology that creates an avatar's expression similar to the user's actual expression, based solely on the user's voice, without the need for cameras.

PRIOR ART

Patent Documents (Patent Document 0001) Korean Registered Patent Publication No. 10-2390781 (2022 Apr. 21.)

SUMMARY

The technical problem addressed by the present invention is to provide a method and device for implementing avatar facial expressions based on voice signals.

According to an embodiment of the present disclosure, a method for processing a voice signal may be provided, comprising: by at least one processor included in a computing device, obtaining a plurality of chunks based on a voice signal—wherein said plurality of chunks include amplitude information of the voice signal for a particular time; inputting a plurality of input signals corresponding to said plurality of chunks into a neural network; computing, by at least one layer included in the neural network, at least one value reflecting a relationship between at least two of said plurality of input signals based on said plurality of input signals; predicting, by an output layer included in the neural network, a plurality of facial expression coefficients by outputting a plurality of output signals based on said at least one value; and implementing an expression of a predetermined avatar based on said plurality of facial expression coefficients, characterized in that at least two of the output signals included in said plurality of output signals are generated by reflecting a relationship between at least two of said plurality of input signals.

The plurality of facial expression coefficients may include at least one facial expression coefficient corresponding to the cheeks, jaw, or mouth of the avatar.

The plurality of facial expression coefficients can be obtained by performing an upsampling operation based on the plurality of output signals, and the upsampling operation may include a deconvolution operation of the neural network output signals.

The plurality of input signals can be obtained by downsampling the chunked voice signals.

The neural network can be trained based on pre-stored learning conditions, wherein the pre-stored learning conditions can be set based on the difference between the average facial expression coefficient value of the ground truth and the value of an arbitrary facial expression coefficient of the ground truth.

When the absolute value of the difference between the average facial expression coefficient value of the ground truth and the value of an arbitrary facial expression coefficient of the ground truth is greater than an arbitrary threshold value, the learning condition can be set as a first condition, and when the absolute value of the difference is smaller than the arbitrary threshold value, the learning condition can be set as a second condition, different from the first condition.

An embodiment of the present invention has the effect of being able to well implement voice-based avatar facial expressions by predicting facial expression coefficients by applying voice signals to a neural network.

BRIEF DESCRIPTION OF THE DRAWINGS

A detailed description of each drawing cited in the detailed description of the present invention is provided to better understand the drawings.

DETAILED DESCRIPTION OF EXEMPLARY EMBODIMENTS

Figure 1:
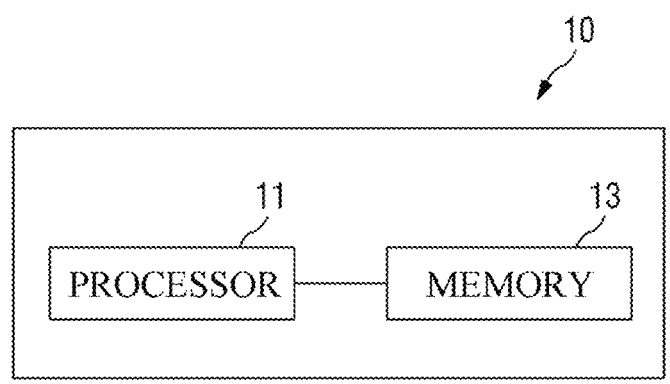
FIG. 1 shows a block diagram of a voice-based avatar facial expression implementation device according to an embodiment of the present invention.

The embodiments disclosed in this specification according to the concept of the present invention are merely illustratively described for the purpose of explaining the embodiments according to the concept of the invention, and the embodiments according to the concept of the invention can be implemented in various forms and are not limited to the embodiments described in this specification.

The embodiments according to the concept of the invention can undergo various modifications and have various forms, so they are illustrated and described in detail in the drawings and the specification. However, this is not intended to limit the embodiments according to the concept of the invention to specific disclosed forms, and it includes all changes, equivalents, or alternatives falling within the spirit and technical scope of the invention.

The terms "first," "second," etc., may be used to describe various components, but the components should not be limited by these terms. These terms are only used to distinguish one component from another, for example, a first component could be named a second component, and similarly, the second component could also be named the first component, without departing from the scope of rights according to the concept of the invention.

The terminology used in this specification is for the purpose of describing particular embodiments only and is not intended to limit the invention. The singular expressions include plural expressions unless the context clearly dictates otherwise. In this specification, terms such as "comprises" or "having" are intended to specify the presence of stated features, numbers, steps, operations, components, parts, or combinations thereof, but not preclude the presence or addition of one or more other features, numbers, steps, operations, components, parts, or combinations thereof.

Unless defined otherwise, all terms used herein, including technical and scientific terms, have the same meaning as commonly understood by one of ordinary skill in the art to which this invention belongs. Terms defined in commonly used dictionaries should be interpreted as having a meaning that is consistent with their meaning in the context of the relevant technology and will not be interpreted in an idealized or overly formal sense unless expressly so defined herein.

Flowchart diagrams of processing and combination diagrams of flowchart diagrams can be performed by computer program instructions. These computer program instructions may be loaded onto a processor of a general-purpose computer, special-purpose computer, or other programmable data processing apparatus, so that the instructions performed through the processor of the computer or other programmable data processing apparatus create means for implementing the functions described in the flowchart block(s). These computer program instructions may also be stored in a computer usable or computer-readable memory that can direct a computer or other programmable data processing apparatus to function in a particular manner, thereby producing an article of manufacture including instruction means that implement the function described in the flowchart block(s). The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions described in the flowchart block(s).

Additionally, the computer-readable storage medium can be provided in the form of non-transitory storage media. Here, "non-transitory" merely means that the storage medium is a tangible device and does not include a signal (e.g., electromagnetic waves). This term does not differentiate between data being stored on the storage medium permanently or temporarily.

Moreover, each block may represent a part of a module, segment, or code that contains one or more executable instructions for executing a specified logical function(s). In some alternative embodiments, the functions mentioned in the blocks may occur out of order. For example, two blocks shown in succession may in fact be executed substantially concurrently, or the blocks may sometimes be executed in reverse order, depending on the functionality involved. For instance, actions performed by a module, program, or other components may be executed sequentially, in parallel, repetitively, or heuristically, and one or more of the above actions may be executed in a different order, omitted, or one or more additional actions may be added.

In this disclosure, the term 'unit' refers to software or hardware components like FPGA (Field Programmable Gate Array) or ASIC (Application Specific Integrated Circuit). 'Unit' performs specific roles but is not limited to software or hardware. 'Unit' can be configured in addressable storage media or configured to instruct one or more processors. Therefore, according to some embodiments, 'unit' can be software components, object-oriented software components, class components, and task components, as well as processes, functions, attributes, procedures, subroutines, segments of program code, drivers, firmware, microcode, circuits, data, databases, data structures, tables, arrays, and variables. The functions provided within the components and 'units' can be combined into a fewer number of components and 'units' or further separated into additional components and 'units'. Moreover, the components and 'units' can be implemented to replicate one or more CPUs in a device or a secure multimedia card. Furthermore, according to various embodiments of this disclosure, 'unit' can include one or more processors.

Hereinafter, preferred embodiments of the invention will be described in detail with reference to the accompanying drawings.

FIG. 1 shows a block diagram of a voice-based avatar facial expression implementation device according to an embodiment of the present invention.

Referring to FIG. 1, the voice-based avatar facial expression implementation device 10 is a computing device. The computing device refers to an electronic device such as a laptop, server, smartphone, or tablet PC.

The voice-based avatar facial expression implementation device 10) includes a processor 11 and a memory 13. In addition, although not shown in FIG. 1, the voice-based avatar facial expression implementation device 10 may further include general electronic configurations (e.g., communication circuits) included in electronic devices.

The processor 11 may include at least one processor implemented to provide different functionalities. For instance, the processor 11 can execute software (e.g., a program) to control at least one other component (e.g., hardware or software components) connected to the processor 11 and perform various data processing or computations. In one embodiment, as part of data processing or computations, the processor 11 may store instructions or data received from other components in a memory 13 (e.g., volatile memory), process instructions or data stored in the volatile memory, and store the result data in a non-volatile memory. In one embodiment, the processor 11 may include a main processor (e.g., a central processing unit or application processor) or a secondary processor (e.g., a graphics processing unit, neural processing unit (NPU), image signal processor, sensor hub processor, or communication processor) that can operate independently or together with the main processor. For example, if the electronic device includes a main processor and a secondary processor, the secondary processor may use lower power or be set to specialize in specified functions compared to the main processor. The secondary processor can be implemented separately from or as part of the main processor. The secondary processor, for example, can control at least part of the functions or statuses related to at least one component (e.g., a communication circuit) of the electronic device in place of, or together with, the main processor while the main processor is inactive (e.g., sleep) or active (e.g., running applications). In one embodiment, the secondary processor (e.g., image signal processor or communication processor) can be implemented as part of another functionally related component (e.g., a communication circuit). In one embodiment, the secondary processor (e.g., neural processing unit) may include hardware architecture specialized for processing artificial intelligence models. Artificial intelligence models can be created through machine learning, which can be performed, for example, within the electronic device executing the artificial intelligence model or via a separate server. Learning algorithms may include supervised learning, unsupervised learning, semi-supervised learning, or reinforcement learning, but are not limited to these examples. Artificial intelligence models may include multiple artificial neural network layers. Artificial neural networks can be a deep neural network (DNN), convolutional neural network (CNN), recurrent neural network (RNN), restricted Boltzmann machine (RBM), deep belief network (DBN), bidirectional recurrent deep neural network (BRDNN), deep Q-networks, or a combination of two or more of these, but are not limited to these types. Artificial intelligence models can include a software structure in addition to, or alternatively to, a hardware structure. Meanwhile, operations of the electronic device (or computing device) described below can be understood as operations of the processor (11). In this disclosure, the functions of the processor are expressed as multiple units (e.g., "—unit") based on the functions of the processor, but this is for convenience of description, and it does not mean that each unit is implemented as separate hardware. That is, the multiple units included in the processor can be implemented in separate hardware, but they can also be implemented in a single hardware.

Additionally, the memory 13 can store various data output by at least one component (e.g., processor 11) of the electronic device. The data can include, for example, software (e.g., a program) and related input or output data for instructions. The memory 13 can include volatile memory or non-volatile memory. The memory 13 can be implemented to store operating systems, middleware, or applications, and/or the aforementioned artificial intelligence models.

Moreover, the communication circuit can support the establishment of a direct (e.g., wired) communication channel or a wireless communication channel between the electronic device and an external electronic device (e.g., a user device), and perform communications via the established communication channel.

The processor 11 executes commands for implementing voice-based avatar facial expressions.

The memory 13 stores the commands executed by the processor 11.

The operations for implementing voice-based avatar facial expressions should be understood as being performed by the processor 11.

Figure 2:
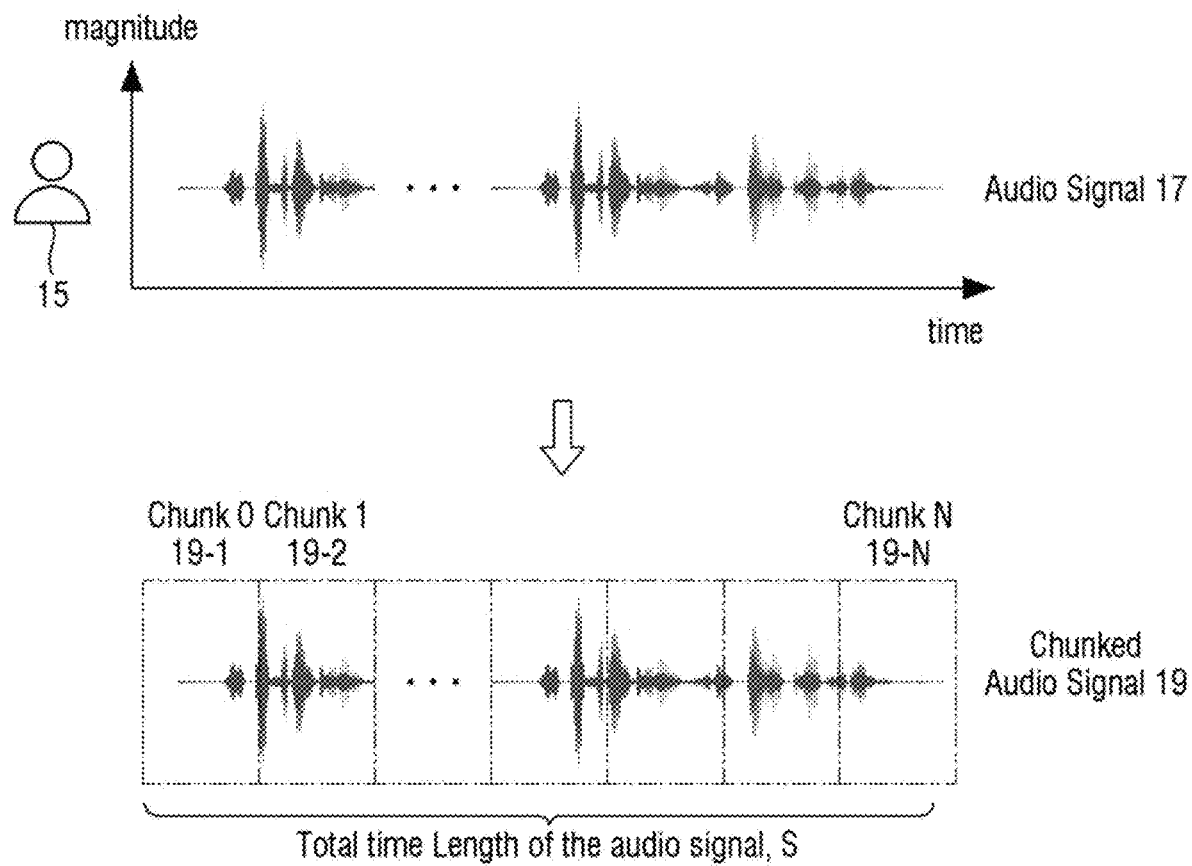
FIG. 2 shows a block diagram for explaining chunking operations of voice signals according to an embodiment of the present invention.

FIG. 2 shows a block diagram for explaining chunking operations of voice signals according to an embodiment of the present invention.

Referring to FIGS. 1 and 2, the computing device 10 receives a voice signal 17 from the user 15 to implement the facial expression of the avatar corresponding to the user 15 based on the voice signal 17.

In the voice signal 17, the X-axis represents time, and the Y-axis represents the amplitude of the signal. The amplitude of the signal is generated at a sample rate of 16,000 samples per second.

The processor 11 divides the voice signal 17 into multiple chunks (chunks; 19-1 to 19-N; N is a natural number). The processor 11 creates chunked voice signals 19 by dividing the voice signal 17 into regular time intervals (for example, every 10 seconds).

In FIG. 2, the interior of the multiple chunks 19-1 to 19-N is shown as a graph, but in reality, they are represented by the values of amplitudes. These amplitude values are within the range of 16 bits. That is, the amplitude values range from −32,768 to +32,767.

The notation "S" in the figure represents the total length of time of the chunked voice signals 19.

Figure 3:
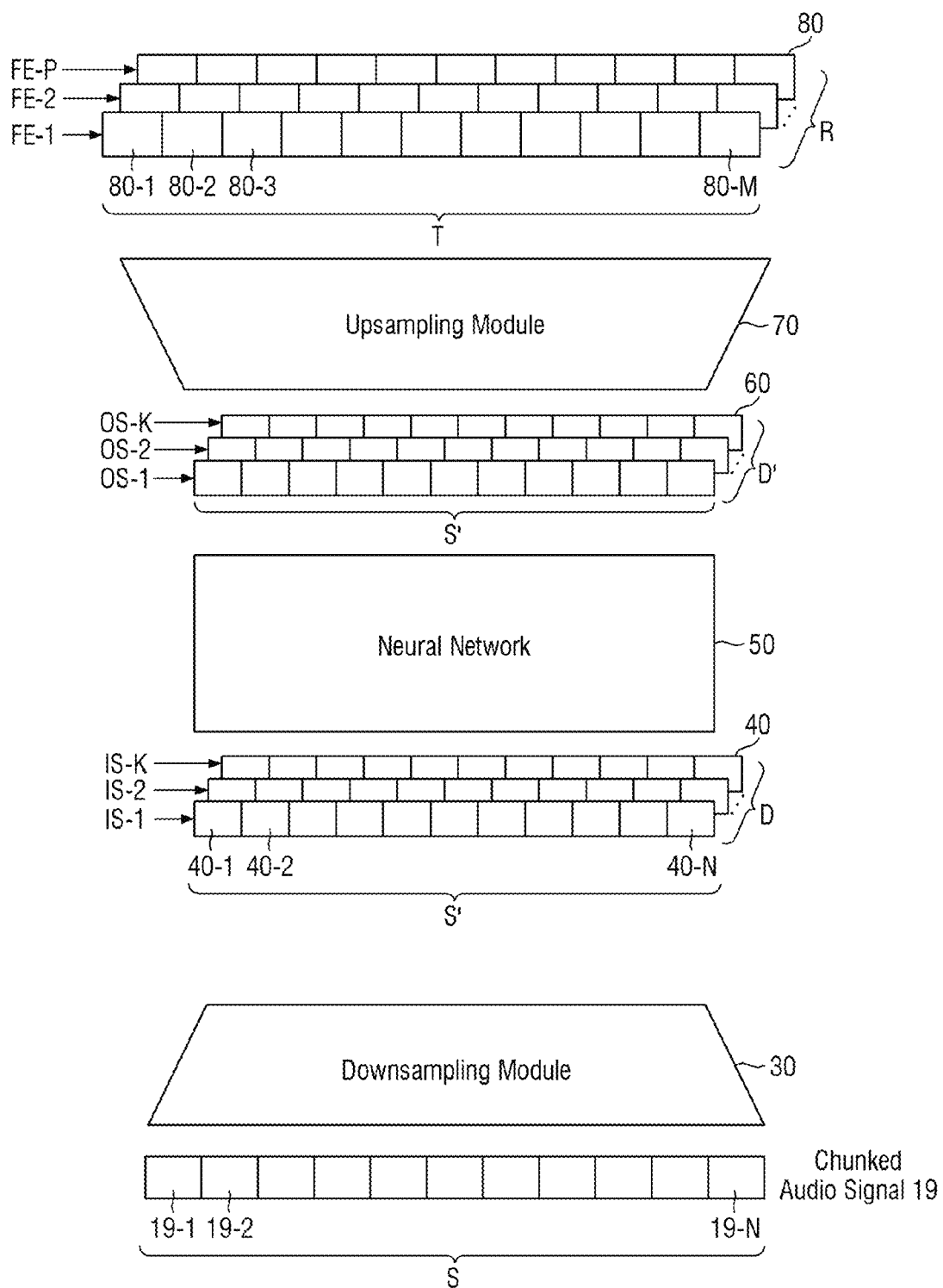
FIG. 3 shows a block diagram of a neural network structure executed by the processor depicted in FIG. 1.

FIG. 3 shows a block diagram of a neural network structure executed by the processor depicted in FIG. 1.

Referring to FIGS. 1 to 3, the processor 11 can preprocess the received voice signals to create neural network input signals 40. Specifically, the processor 11 can downsample the chunked voice signals 19 to create neural network input signals 40.

The downsampling is performed by a downsampling module 30.

The processor 11 applies the chunked voice signals 19 to the downsampling module (30) to output the neural network input signals 40.

The chunked voice signals 19 include multiple chunks 19-1 to 19-N.

The downsampling module 30 includes multiple downsampling layers (downsampling layers; not shown). The multiple downsampling layers are convolution layers. For example, the downsampling module 30 can include 7 convolution layers. A 1D convolution operation is performed in the convolution layer. Each of these convolution layers can include multiple kernels. For instance, the number of kernels included in each of the convolution layers can be 512.

By setting the kernel stride moving along the voice time axis greater than 1, the total length of time S' of the neural network input signals 40 is made shorter than the total length of time S of the chunked voice signals 19.

The total length of time S' of the neural network input signals 40 is shorter than the total length of time S of the chunked voice signals 19. For example, if the total length of time S of the chunked voice signals 19 is assumed to be 160,000 seconds, then the total length of time S' of the neural network input signals 40 would be 499 seconds.

Since multiple kernels are used in the process where a 1D convolution operation is performed, the neural network input signals 40 include multiple dimensions (dimensions, D). For example, the neural network input signals 40 can include 512 dimensions. That is, the dimension D of the neural network input signals 40 is 512. These dimensions represent the number of channels used in the 1D convolution operation.

The neural network input signals 40 contain multiple input signals (IS-1, IS-2, . . . , and IS-K; K is a natural number) each having a total length of time S' of 499 seconds. When the dimension D of the neural network input signals 40 is 512, K can be 512.

The number of chunks N in each of the input signals (40-1 to 40-N; N is a natural number) is the same as the number of chunks N in the chunked voice signals 19-1 to 19-N. Here, each chunk contains amplitude information of the voice signal 17 for a specific time.

The processor 11 applies the downsampled voice signals 40 to the neural network 50 and generates neural network output signals 60 to enhance the feature extraction of the downsampled voice signals 40.

The neural network 50 may include a transformer model but is not limited to it.

The transformer model is a deep learning model mainly used in natural language processing (NLP). Since the transformer model is a well-known deep learning model, its specific internal structure is omitted here.

The processor 11 can compute at least one value reflecting the relationship between at least two of the multiple input signals 40 based on the multiple input signals by at least one layer included in the neural network 50. Specifically, the processor 11 can acquire output signals reflecting the relationship between input signals by computing the relationship (or relevance) between multiple chunks based on the input signals implemented as chunked time-series data.

In this case, the processor 11 can output multiple output signals by reflecting at least one value reflecting the relationship between input signals by an output layer included in the neural network 50. At this time, at least two of the output signals included in the multiple output signals can be generated by reflecting the relationship between at least two of the multiple input signals.

Additionally, the processor 11 can predict multiple facial expression coefficients based on the multiple output signals.

Figure 4:
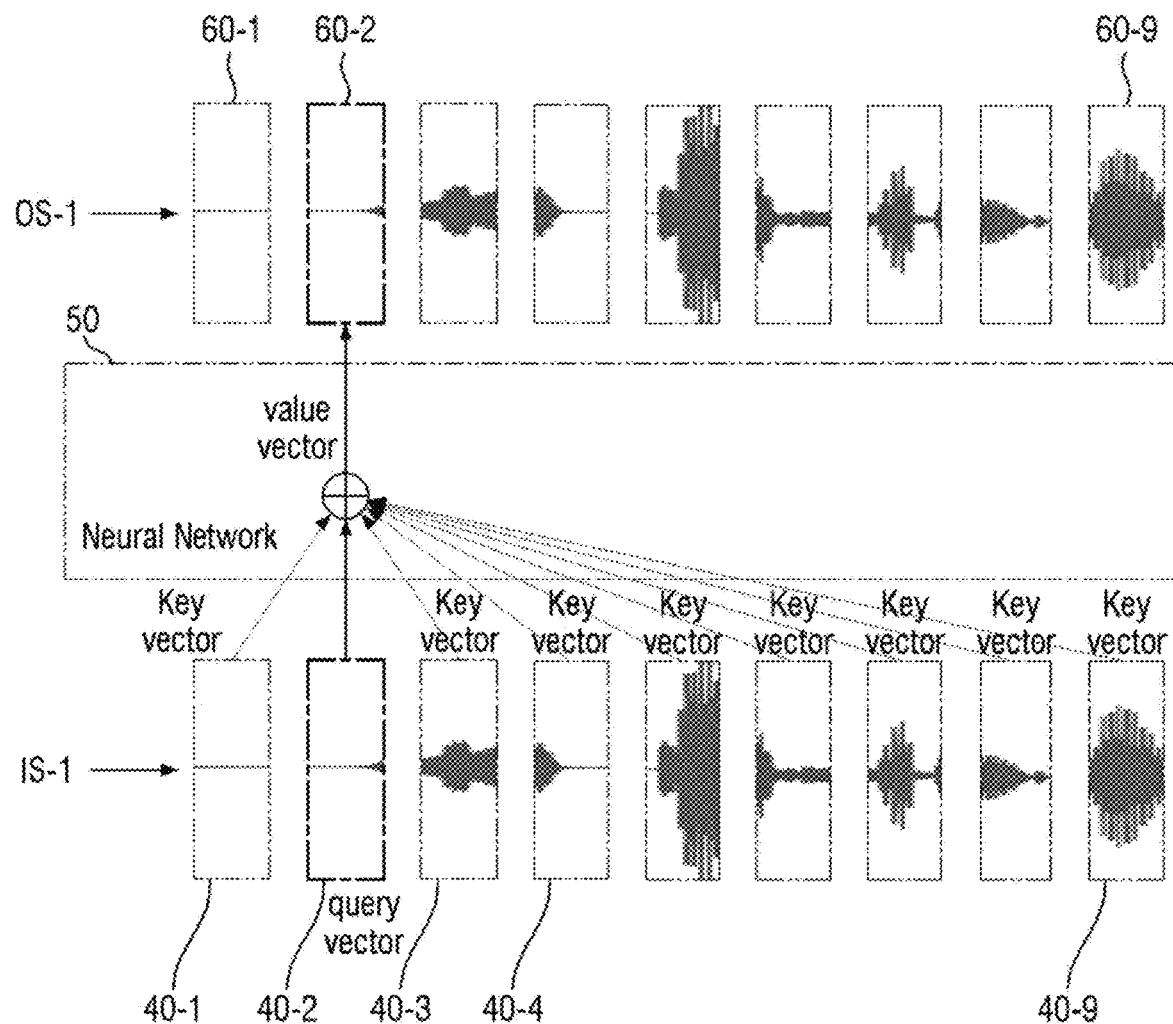
FIG. 4 shows a conceptual diagram explaining the operations of the neural network depicted in FIG. 3.

FIG. 4 shows a conceptual diagram explaining the operations of the neural network depicted in FIG. 3.

FIG. 4 is a conceptual diagram for explaining the operation of the neural network, and in the actual neural network, computations are performed numerically.

The input signal (IS-1) and output signal (OS-1) shown in FIG. 4 are any one of the input signals (IS-1~IS-K) and output signals (OS-1~OS-K) shown in FIG. 3, respectively.

Referring to FIGS. 1 to 4, when the input signal (IS-1) is applied to the neural network 50.

the input signal (IS-1) includes multiple chunks (40-1~40-9).

The output signal (OS-1) includes multiple chunks (60-1~60-9).

For convenience of explanation, FIG. 4 shows that the number of chunks in input signal (IS-1) and output signal (OS-1) is nine, but the number of chunks can vary depending on the embodiment.

In FIG. 4, the initial weights of the neural network 50 are initialized with pre-trained weights for large-volume voice data.

In FIG. 4, when the second chunk 40-2 is applied to the neural network 50, the operations of the neural network 50 are explained.

The second chunk 40-2 is a query vector.

The remaining chunks (40-1, 40-3~40-9) are key vectors. The remaining chunks (40-1, 40-3~40-9) are related to the second chunk 40-2.

The value vector represents the amplitude values that indicate the features of the actual voice signal 15.

A dot product is performed between the query vector of the second chunk 40-2 and the key vector of the first chunk 40-1. Similarly, dot products are performed with the third 40-3, fourth 40-4, and remaining chunks (40-5~40-9).

When the dot products are performed, scores are generated, indicating how well the query vector and key vectors match.

The processor 11 multiplies the scores generated by the dot products with the value vectors, adds up the multiplied values, and generates the second chunk 60-2.

The output signal 60 of the neural network 60-2 in the second chunk represents the features of the voice signal 15 better than the input signal 40 in the second chunk 40-2. For example, if a small amplitude occurs in the first chunk 40-1, it is represented in the second chunk 40-2 as increasing or decreasing in amplitude.

Thus, through the neural network 50, the amplitude of the voice signal 15 included in the second chunk 40-2 is considered in relation to other chunks (40-1, 40-3~40-9) and the second chunk 60-2 is generated.

Although the second chunk 60-2 is shown similarly to the second chunk 40-2 in FIG. 4, it is actually different. The second chunk 40-2 and second chunk 60-2 are actually expressed numerically.

Referring to FIG. 3, feature extraction of the downsampled voice signal 40 can be enhanced through the neural network (50).

The neural network output signal 60 contains multiple output signals (OS-1, OS-2, . . . , and OS-K; K is a natural number), each having a total length of time S' of 499 seconds. When the dimension D' of the neural network output signal 60 is 512, K can be 512.

The processor 11 can post-process the neural network output signal 60 to predict multiple facial expression coefficients. Specifically, the processor 11 can perform upsampling on the neural network output signal 60.

The upsampling is carried out by an upsampling module 70.

The upsampling module 70 includes multiple upsampling layers (not shown). The multiple upsampling layers are deconvolution layers. For example, the downsampling module 30 can include seven deconvolution layers. A 1D deconvolution operation is performed in the deconvolution layer. Each of these deconvolution layers can contain multiple kernels.

The processor 11 applies the neural network output signal 60 to the upsampling module 70 and outputs multiple facial expression coefficients. These facial expression coefficients have values between 0 and 1. Based on the multiple facial expression coefficients, the meshes constructing the 3D avatar can be deformed. Thus, the facial expression of the 3D avatar can change according to the multiple facial expression coefficients. The multiple facial expression coefficients represent coefficients indicating facial expressions of the avatar's face corresponding to specific facial features. The multiple facial expression coefficients may be referred to as shape keys, vertex keys, or morphing. The facial expression coefficients can correspond to the lower part of the avatar's face. Specifically, the facial expression coefficients may include at least one facial expression coefficient corresponding to the avatar's mouth, jaw, or other facial features, but are not limited to these.

The upsampling output signal 80 includes multiple chunks (80-1~80-M; M is a natural number), each having a time length of 10 seconds.

Facial expression coefficients can be generated at 60 per second. Assuming that 60 facial expression coefficients are generated per second, one chunk 80-1 can include 600 facial expression coefficients.

The total time length T of the upsampling output signal 80 can be 600 seconds. That is, since the time length of one chunk is 10 seconds, there can be 60 chunks.

The total time length T of the upsampling output signal 80 is longer than the total time length S' of the neural network output signal 60. For example, if the total time length S' of the neural network output signal 80 is assumed to be 499 seconds, the total time length T of the upsampling output signal 80 is 600 seconds.

The upsampling output signal 80 includes multiple channels R. The multiple channels R correspond to the facial expression coefficients. For example, the first channel FE-1 may be facial expression coefficients indicating the size of the mouth shape. The second channel FE-2 may be facial expression coefficients indicating the opening of the jaw of the avatar's face. The number of channels R can be 31. The 31 channels represent the facial expression coefficients of the lower part of the avatar's face, such as the cheeks, jaw, or mouth.

The total time length S' of the neural network output signal 60 and the total length of the facial expression coefficients are different. However, through the upsampling operation, the total time length S' of the neural network output signal 60 and the total time length T of the upsampling output signal 80 can be matched.

The processor 11 can train the voice signal processing engine, including the neural network 50, based on pre-stored learning conditions. Specifically, the processor 11 can adjust at least one weight corresponding to the downsampling module 30, at least one weight corresponding to the upsampling module 70, and at least one weight corresponding to the neural network 50 based on pre-stored learning conditions.

Here, the pre-stored learning conditions can be set based on the difference between the average facial expression coefficient value of the ground truth and the value of an arbitrary facial expression coefficient of the ground truth. Specifically, when the absolute value of the difference between the average facial expression coefficient value of the ground truth and the value of an arbitrary facial expression coefficient of the ground truth is greater than an arbitrary threshold value, the learning condition can be set as a first condition. Furthermore, when the absolute value of the difference is smaller than the arbitrary threshold value, the learning condition can be set as a second condition, different from the first condition. The specifics of these learning conditions are further explained in FIGS. 5A-5C.

For training the weights included in the downsampling module 30, the weights included in the neural network 50, and the weights included in the upsampling module 70, a loss function can be defined as follows:

$$\text{loss}_n = \begin{cases} (y_n - y'_n)^2 & \text{if } |y_n - y'_n| < \alpha \\ \alpha(|y_n - y'_n| - \alpha) & \text{if } |y_n - y'_n| \geq \alpha \end{cases} \quad \text{[Mathematical Equation 1]}$$

Here, $\text{loss}_n$ represents the value of the loss function, $y_n$ represents the value of the facial expression coefficient of the nth ground truth, y'n represents the value of the nth predicted facial expression coefficient, and alpha represents a constant.

Figure 5A:
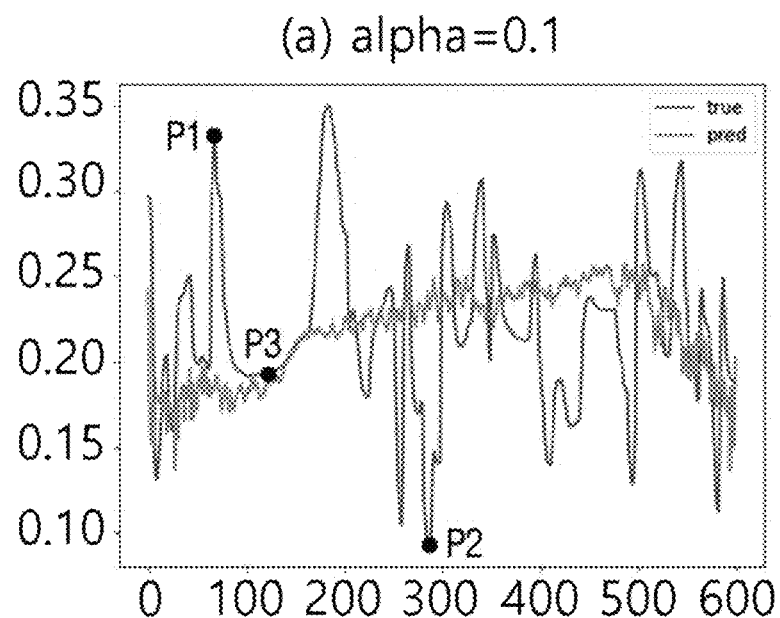
FIGS. 5A-5C illustrate graphs of facial expression coefficients according to the parameter changes in the loss function, showing how the weights included in the downsampling module, the neural network, and the upsampling module are updated.
Figure 5B:
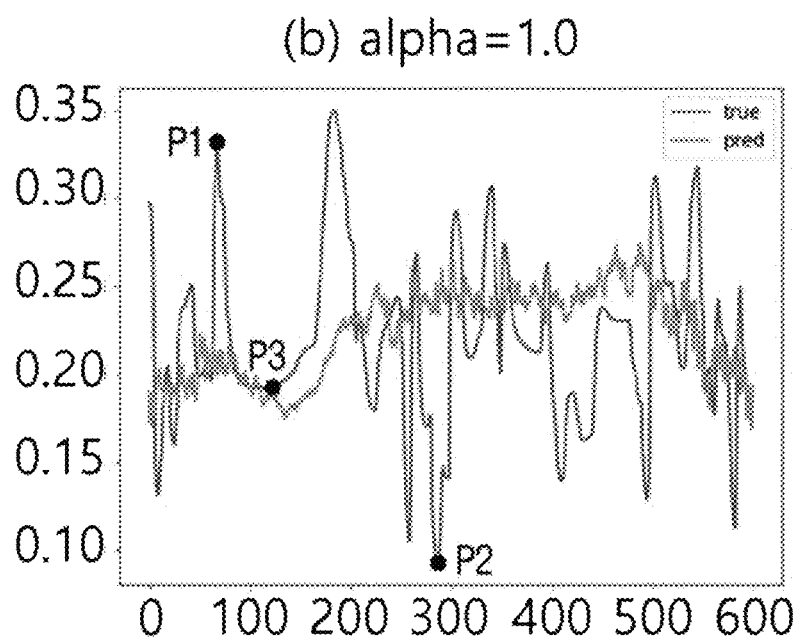
Figure 5C:
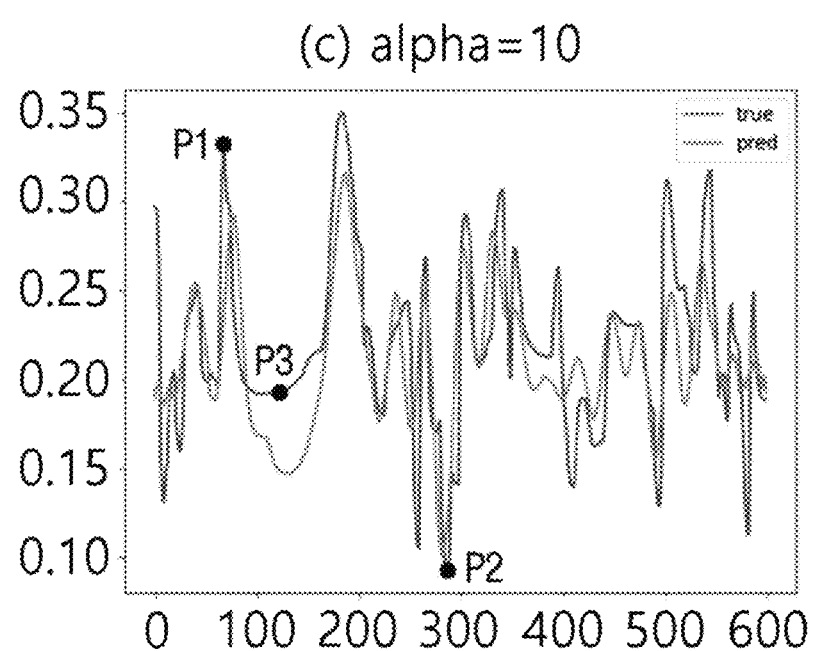

The loss function will be further explained in FIGS. 5A-5C.

The processor 11 generates facial expression coefficient values corresponding to the ground truth for creating the ground truth by using the voice signal 17 of the user 15. Here, the facial expression coefficient values represent the facial expression coefficients of the lower part of the avatar's face.

The processor 11 extracts an arbitrary number (e.g., 100), an arbitrary time (e.g., 600 seconds), and a number of channels (e.g., 31) from the generated facial expression coefficient values to create the ground truth.

Thus, the ground truth consists of 31 channels over a duration of 600 seconds, with each channel containing 100 data points.

The upsampling output signal 80 also encompasses 31 channels over 600 seconds, meaning that the ground truth and the upsampling output signal 80 correspond to each other.

The channel values of the ground truth undergo normalization to range between −1.0 and 1.0.

FIGS. 5A-5C illustrate graphs of facial expression coefficients according to the parameter changes in the loss function, showing how the weights included in the downsampling module, the neural network, and the upsampling module are updated. FIG. 5A represents the graph of facial expression coefficients when the parameter alpha in the loss function is 0.1. FIGS. 5B and 5C represent the graphs of facial expression coefficients for alpha values of 1.0 and 10, respectively.

In these graphs, the X-axis represents time, and the Y-axis represents the values of facial expression coefficients.

The label "pred" in the graphs in FIG. 5A to 5C represents the facial expression coefficients outputted through the downsampling module 30, the neural network 50, and the upsampling module 70, while "true" represents the facial expression coefficients of the ground truth.

The unit of time on the x-axis is 1/60th of a second, so 600 on the x-axis means 10 seconds. Facial expression coefficients have values between 0 and 1.

Referring to FIG. 3, one chunk (e.g., 80-1) included in the upsampled output signal 80 has a time length of 10 seconds. In FIG. 5A to 5C, the ground truth facial expression coefficients ("true" graph) remain the same, implying that these graphs correspond to a chunk included in the upsampling output signal (80) (e.g., chunk 80-1, 80-2, or 80-3).

In FIG. 5A, when the alpha value of the loss function is 0.1, the difference between the ground truth facial expression coefficients ("true" graph) and the predicted facial expression coefficients ("pred" graph) is significant at points P1 and P2. This is because the processor 11 considers the facial expression coefficient values at points P1 and P2 as noise and excludes them. The alpha value here refers to the value of alpha in Mathematical Equation 1.

At point (P1, P2), the ground truth facial expression coefficient value (e.g., 0.3, 0.1) is relatively higher or lower than the average facial expression coefficient value of the ground truth (e.g., 0.2). At point P1, the ground truth facial expression coefficient value (e.g., 0.3) is relatively higher than the average facial expression coefficient value of the ground truth (e.g., 0.2). At point P2, the ground truth facial expression coefficient value (e.g., 0.1) is relatively lower than the average facial expression coefficient value of the ground truth (e.g., 0.2).

On the other hand, at point P3, there is almost no difference between the ground truth facial expression coefficient ("true" graph) and the predicted facial expression coefficient ("pred" graph). Here, the ground truth facial expression coefficient value (e.g., 0.2) is nearly the same as the average value of the ground truth facial expression coefficients (e.g., 0.2), which can be calculated by averaging the values of facial expression coefficients of the ground truth.

Therefore, when the alpha value of the loss function is 0.1, the closer the value of the ground truth facial expression coefficient is to the average value of the ground truth facial expression coefficients, the smaller the difference between the ground truth facial expression coefficient ("true" graph) and the predicted facial expression coefficient ("pred" graph).

Conversely, the further the value of the ground truth facial expression coefficient deviates from the average value of the ground truth facial expression coefficients, the larger the difference between the ground truth facial expression coefficient ("true" graph) and the predicted facial expression coefficient ("pred" graph).

When the alpha value of the loss function is 0.1, the facial expression coefficient values at points P1 and P2 are not predicted well.

However, it is important to accurately predict facial expression coefficients with large values. Larger facial expression coefficients result in more significant changes in the facial expressions of the avatar. Therefore, to more clearly reflect the differences in the avatar's facial expressions, it is crucial to accurately predict facial expression coefficients with larger values.

Referring to FIG. 5B, when the alpha value of the loss function is 1.0, the predicted facial expression coefficients do not show a significant difference from the case when the alpha value is 0.1 (as shown in FIG. 5A).

The difference between the ground truth facial expression coefficients ("true" graph) and the predicted facial expression coefficients ("pred" graph) remains significant at points P1 and P2. almost no difference between the ground truth facial expression coefficients ("true" graph) and the predicted facial expression coefficients ("pred" graph) is observed at point P3.

Referring to FIG. 5C, when the alpha value of the loss function is 10, the difference at points P1 and P2 between the ground truth facial expression coefficients ("true" graph) and the predicted facial expression coefficients ("pred" graph) is not as significant as in FIG. 5A. When the alpha value of the loss function is 10, the processor (11) does not consider the facial expression coefficient values at points P1 and P2 as noise.

On the other hand, the difference at point P3 between the ground truth facial expression coefficients ("true" graph) and the predicted facial expression coefficients ("pred" graph) differs from that in FIG. 5A.

Like in FIGS. 5A and 5B, when the alpha value of the loss function is small, the facial expression coefficient values of the ground truth that are similar to the average facial expression coefficient value of the ground truth (as in point P3) are well predicted. However, the values of the ground truth facial expression coefficients that significantly differ from the average value (as in points P1 and P2) are not well predicted.

Conversely, as in FIG. 5C, when the alpha value of the loss function is large, the facial expression coefficient values of the ground truth that significantly differ from the average value (as in points P1 and P2) are well predicted, while those similar to the average value (as in point P3) are not well predicted.

The processor 11 adjusts the alpha value in the loss function to a larger value to better predict the facial expression coefficient values of the ground truth that significantly differ from the average value (as in points P1 and P2), and trains the weights included in the downsampling module 30, the neural network 50, and the upsampling module 70.

Also, the processor 11 sets a smaller alpha value in the loss function to better predict the facial expression coefficient values of the ground truth that are similar to the average value (as in point P3), and trains the weights accordingly.

In other words, the processor 11 calculates the average value of the facial expression coefficients of the ground truth. The ground truth refers to facial expression coefficient values matching the voice signal 17 of the user 15.

The processor 11 calculates the absolute difference in value between the average facial expression coefficient of the ground truth and the channel values of the upsampling output signal 90.

When this absolute value is greater than an arbitrary threshold value, the processor 11 sets the alpha value in the loss function as a first value. This first value is an arbitrary value greater than a first preset value (e.g., 5). For example, the arbitrary threshold value can be 0.1, and the first value can be 10. The first value lies within a range between a first arbitrary value (e.g., 5) and a second arbitrary value (e.g., 20). The second arbitrary value is greater than the first arbitrary value.

When the absolute value is less than the arbitrary threshold value, the processor 11 sets the alpha value in the loss function as a second value. This second value is less than the first arbitrary value (e.g., 5). For example, the second value can be 0.1. The second value ranges from 0 to less than the first arbitrary value (e.g., 5).

Depending on the embodiment, the processor (11) may set the first arbitrary value, the second arbitrary value, the first value, or the second value differently.

By setting the alpha value differently based on the difference between the average facial expression coefficient value of the ground truth and the channel values of the upsampling output signal 80 as in the present invention, both the facial expression coefficient values of the ground truth that significantly differ from the average value (as in points P1 and P2) and those similar to the average value (as in point P3) can be well predicted.

Depending on the embodiment, the processor 11 counts the number of epochs for the loss function. When the number of epochs for the loss function exceeds an arbitrary number (e.g., 20), the processor 11 may set the alpha value in the loss function to the second value. When the number of epochs for the loss function exceeds an arbitrary number (e.g., 20), the deviation of the error in the loss function is not significant. The processor 11 may set this arbitrary number (e.g., 20) differently depending on the embodiment.

Figure 6:
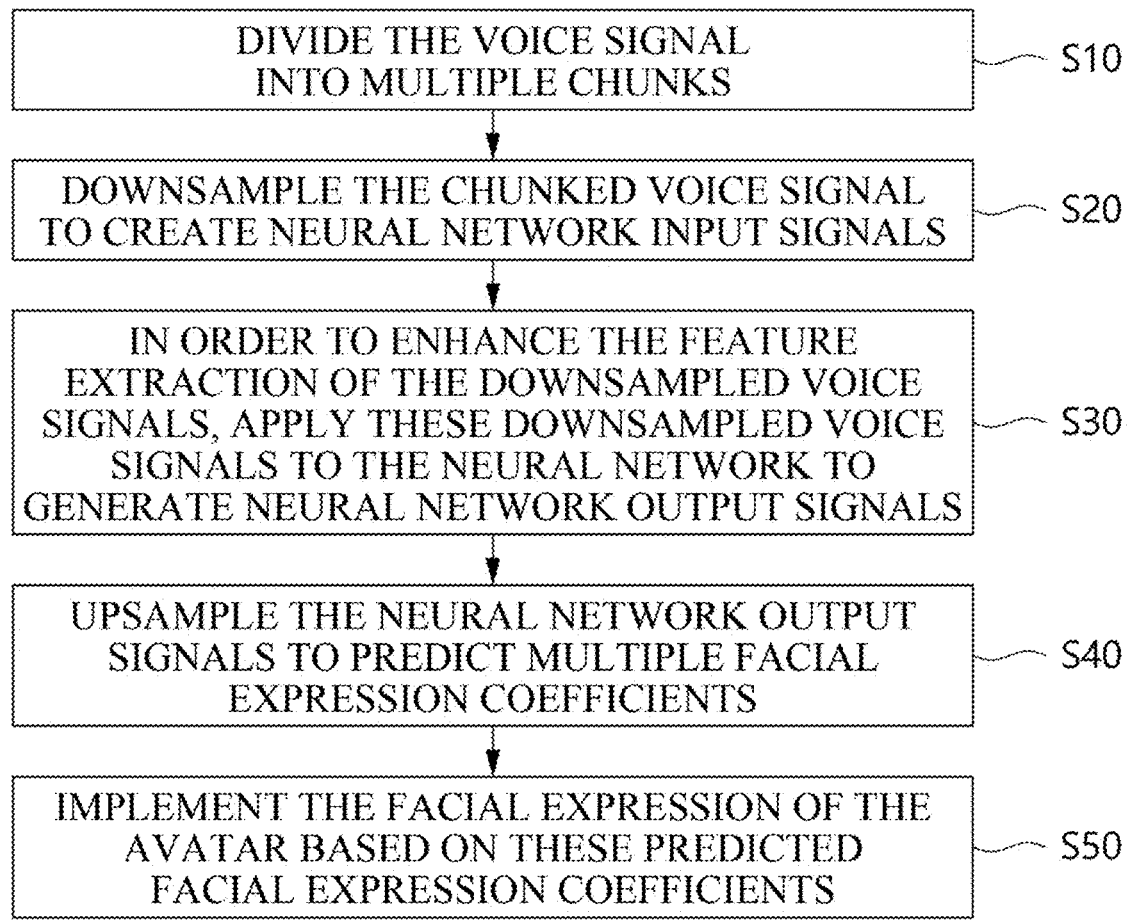
FIG. 6 shows a flowchart of a method for implementing voice-based avatar facial expressions according to an embodiment of the present invention.
Figure 7A:
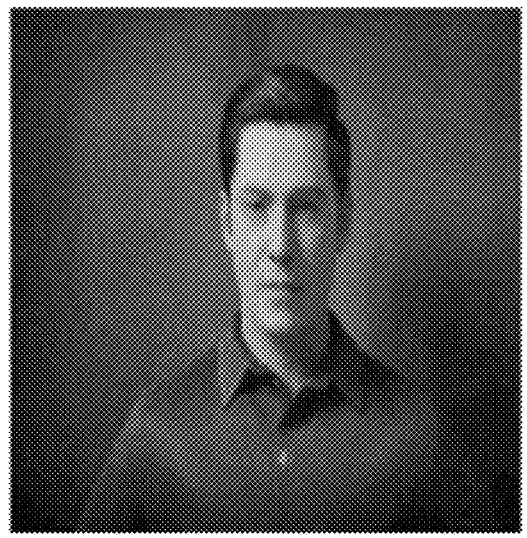
FIGS. 7A-7D display images of 3D avatars implemented based on the voice according to an embodiment of the present invention.
Figure 7B:
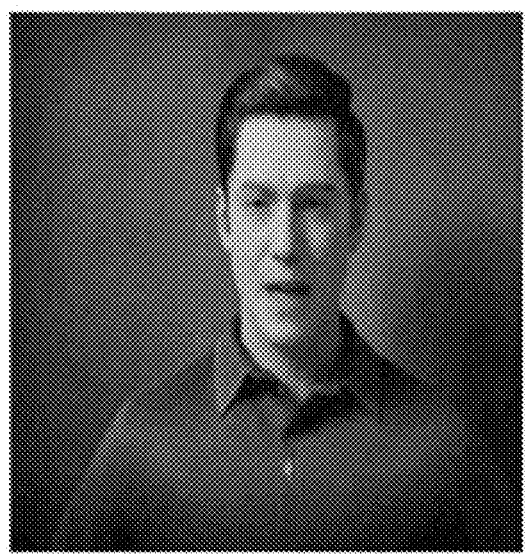
Figure 7C:
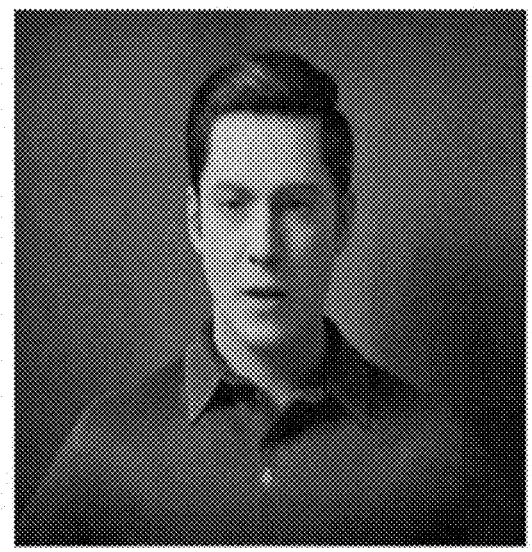
Figure 7D:
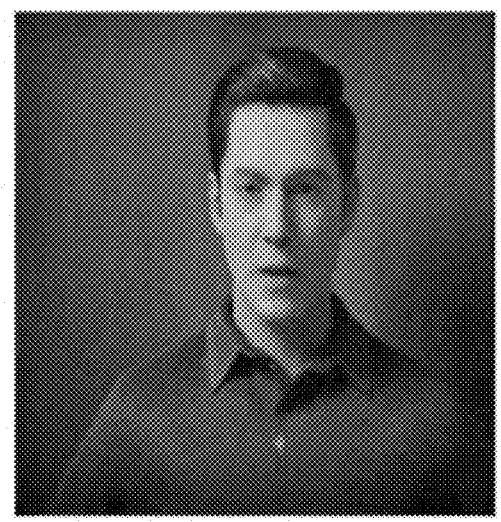

FIG. 6 shows a flowchart of a method for implementing voice-based avatar facial expressions according to an embodiment of the present invention.

Referring to FIGS. 1 to 6, in step S10, the processor 11 divides the voice signal 17 into multiple chunks (19-1 to 19-N).

The processor 11, in step S20, then downsamples the chunked voice signal 19 to create neural network input signals 40.

The processor 11, in step S30, in order to enhance the feature extraction of the downsampled voice signals 40, applies these downsampled voice signals 40 to the neural network 50 to generate neural network output signals 60. The neural network input signals 40 and the downsampled voice signals 40 are the same signals.

Next, the processor 11, in step S40, upsamples the neural network output signals 60 to predict multiple facial expression coefficients. These multiple facial expression coefficients are included in the upsampling output signal 80.

The processor 11, in step S50, then implements the facial expression of the avatar based on these predicted facial expression coefficients.

FIGS. 7A-7D display images of 3D avatars implemented based on the voice according to an embodiment of the present invention. FIG. 7A to 7D show images of avatars with different expressions implemented over time.

Referring to FIGS. 1, 2, and 7A-D, the processor 11 implements the facial expression of the avatar based on the predicted multiple facial expression coefficients.

The avatar can be implemented in 3D. The reference image of the avatar may be a pre-captured image of the user 15 by a camera (not shown).

The invention has been described with reference to specific embodiments shown in the drawings, but these are merely illustrative and it will be understood by those skilled in the art that various modifications and equivalent other embodiments are possible from this description. Therefore, the true scope of protection of the invention should be determined by the technical spirit of the attached claims.

DESCRIPTION OF REFERENCE NUMERALS

10: Voice-based avatar facial expression implementation device;
11: Processor;
13: Memory;
30: Downsampling module;
50: Neural network;
70: Upsampling module;

The invention claimed is:

1. A method for processing a voice signal, comprising:
obtaining, by at least one processor in a computing device, a plurality of chunks based on the voice signal, wherein the plurality of chunks include amplitude information of the voice signal for a particular time;
performing a down-sampling operation on the plurality of chunks using convolution layers to obtain a plurality of input signals;
inputting the plurality of input signals into a neural network;
processing, by at least one layer in the neural network, the plurality of input signals into query, key, and value vectors, and computing at least one weight reflecting a relationship between at least two of the plurality of input signals;
predicting, by an output layer in the neural network, a plurality of facial expression coefficients by outputting a plurality of output signals based on the at least one weight; and
implementing an expression of a predetermined avatar based on the plurality of facial expression coefficients,
wherein at least two of the output signals are generated by reflecting the relationship between the at least two of the plurality of input signals,
wherein the neural network is trained based on a pre-stored learning condition, the pre-stored learning condition being set based on an absolute difference between an average value of ground truth facial expression coefficients and a value of an arbitrary facial expression coefficient, such that when the absolute difference exceeds a threshold, the pre-stored learning condition is set as a first condition, and when the absolute difference is less than or equal to the threshold, the pre-stored learning condition is set as a second condition, and
wherein the plurality of facial expression coefficients includes multiple channels, each channel including coefficients corresponding to a different facial feature of a lower part of an avatar's face, the lower part including at least one of cheeks, jaw, mouth, or any combination thereof.

2. The method of claim 1, wherein the plurality of facial expression coefficients include at least one channel including coefficients corresponding to the cheeks of the avatar, at least one channel including coefficients corresponding to the jaw of the avatar, or at least one channel including coefficients corresponding to the mouth of the avatar.

3. The method of claim 1, wherein the plurality of facial expression coefficients are obtained by performing an upsampling operation based on the plurality of output signals, the upsampling operation including a deconvolution operation applied to the neural network.

4. A computing device for processing a voice signal, comprising:
a processor executing commands; and
a memory storing the commands,
wherein the processor is configured to:
obtain a plurality of chunks based on the voice signal, wherein the plurality of chunks include amplitude information of the voice signal for a particular time;
perform a down-sampling operation on the plurality of chunks using convolution layers to obtain a plurality of input signals;
input the plurality of input signals into a neural network;
process, by at least one layer in the neural network, the plurality of input signals into query, key, and value vectors, and computerate least one weight reflecting a relationship between at least two of the plurality of input signals;
predict, by an output layer in the neural network, a plurality of facial expression coefficients by outputting a plurality of output signals based on the at least one weight; and
implement an expression of a predetermined avatar based on the plurality of facial expression coefficients,
wherein at least two of the output signals are generated by reflecting the relationship between the at least two of the plurality of input signals,
wherein the neural network is trained based on a pre-stored learning condition, the pre-stored learning condition being set based on an absolute difference between an average value of ground truth facial expression coefficients and a value of an arbitrary facial expression coefficient, such that when the absolute difference exceeds a threshold, the pre-stored learning condition is set as a first condition, and when the absolute difference is less than or equal to the threshold, the pre-stored learning condition is set as a second condition, and
wherein the plurality of facial expression coefficients includes multiple channels, each channel including coefficients corresponding to a different facial feature of a lower part of an avatar's face, the lower part including at least one of cheeks, jaw, mouth, or any combination thereof.

5. The computing device of claim 4, wherein the plurality of facial expression coefficients include at least one channel including coefficients corresponding to the cheeks of the avatar, at least one channel including coefficients corresponding to the jaw of the avatar, or at least one channel including coefficients corresponding to the mouth of the avatar.

6. The computing device of claim 4, wherein the plurality of facial expression coefficients are obtained by performing an upsampling operation based on the plurality of output signals, the upsampling operation including a deconvolution operation applied to the neural network.

* * * * *